(12) United States Patent
Yamada (10) Patent No.: US 7,903,343 B2
(45) Date of Patent: Mar. 8, 2011

(54) ZOOM EYEPIECE LENS SYSTEM

(75) Inventor: Kenji Yamada, Yachiyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/709,226

(22) Filed: Feb. 19, 2010

(65) Prior Publication Data
US 2010/0149649 A1    Jun. 17, 2010

Related U.S. Application Data

(63) Continuation of application No. PCT/JP2008/067976, filed on Sep. 26, 2008.

(30) Foreign Application Priority Data

Oct. 4, 2007    (JP) .................................. 2007-260919

(51) Int. Cl.
*G02B 15/14* (2006.01)
(52) U.S. Cl. ......... 359/645; 359/643; 359/689; 359/716; 359/740; 359/784; 359/791
(58) Field of Classification Search .................. 359/643, 359/645, 689, 716, 740, 784, 791
See application file for complete search history.

(56) References Cited

U.S. PATENT DOCUMENTS 5,663,834 A * 9/1997 Koizumi ....................... 359/645
6,384,984 B1   5/2002 Ishii et al.

FOREIGN PATENT DOCUMENTS

| JP | 9-80326 A | 3/1997 |
| JP | 2001-242390 A | 9/2001 |

* cited by examiner

*Primary Examiner* — Evelyn A. Lester
(74) *Attorney, Agent, or Firm* — Miles & Stockbridge P.C.

(57) ABSTRACT

A zoom eyepiece lens system EL includes, in order from an eyepoint EP side: a first lens group G1 having positive refractive power; a second lens group G2 having positive refractive power; and a third lens group G3 having negative refractive power. Upon zooming from a low magnification end state to a high magnification end state, the second lens group G2 and the third lens group G3 move along an optical axis in opposite directions with each other. The second lens group G2 includes, in order from the eyepoint EP side, a first lens L3 having negative refractive power, a second lens L4 having positive refractive power, and a third lens L5 having positive refractive power. At least one aspherical surface is formed on the third lens L5.

4 Claims, 12 Drawing Sheets

ZOOM EYEPIECE LENS SYSTEM

CROSS-REFERENCE TO RELATED APPLICATION

This application is a continuation of International Application No. PCT/JP2008/067976 filed Sep. 26, 2008.

TECHNICAL FIELD

The present invention relates to a zoom eyepiece lens system.

BACKGROUND ART

A zoom eyepiece lens system securing an eye-relief, and correcting various aberrations has been known (for example, see Japanese Patent Application Laid-Open No. 9-080326).

However, the conventional zoom eyepiece lens system has problems that the eye-relief cannot be sufficiently secured and correction of aberrations is not sufficient yet.

DISCLOSURE OF THE INVENTION

The present invention is made in view of the above-described problems, and has an object to provide a zoom eyepiece lens system having high optical performance with correcting various aberrations excellently, and securing a sufficient eye-relief.

In order to solve the problems, the present invention provides a zoom eyepiece lens system comprising, in order from an observation eye (eyepoint) side: a first lens group having positive refractive power; a second lens group having positive refractive power; and a third lens group having negative refractive power; upon zooming from a low magnification end state to a high magnification end state, the second lens group and the third lens group moving along an optical axis in opposite directions with each other, the second lens group including, in order from the observation eye side, a first lens having negative refractive power, a second lens having positive refractive power, and a third lens having positive refractive power, and at least one aspherical surface being formed on the third lens.

In the aspect of the present invention, it is preferable that the following conditional expression is satisfied:

$$|re| \leq |ro|$$

where re denotes a radius of curvature of the reference sphere of the observation eye side of the third lens composing the second lens group, and ro denotes a radius of curvature of the reference sphere of an object side of the third lens composing the second lens group.

In the aspect of the present invention, it is preferable that when the aspherical surface in the third lens composing the second lens group is expressed by the following expression:

$$x = cy^2/\{1+(1-kc^2y^2)^{1/2}\} + A4y^4 + A6y^6 + A8y^8 + \ldots$$

where y denotes a vertical height from an optical axis, x denotes a distance along the optical axis from a tangent surface on the vertex of the aspherical surface to the aspherical surface at the height y, c denotes a radius of curvature of a reference sphere, k denotes a conical coefficient, and An denotes an aspherical coefficient of n-th order (where n=4, 6, 8, . . . ), the conical coefficient k satisfies the following conditional expression:

$$k \leq 0.$$

With constructing a zoom eyepiece lens system according to the present invention as described above, it becomes possible to provide a zoom eyepiece lens system having high optical performance with excellently correcting various aberrations and securing a sufficient eye-relief.

EMBODIMENT FOR CARRYING OUT THE INVENTION

A preferred embodiment of the present invention is explained below with reference to accompanying drawings. A lens construction of a zoom eyepiece lens system according to the present invention is explained with reference to FIG. 1. The zoom eyepiece lens system EL includes, in order from an observation eye (eyepoint EP) side, a first lens group G1 having positive refractive power, a second lens group G2 having positive refractive power, and a third lens group G3 having negative refractive power, upon zooming from a low magnification end state (in a state where the focal length of the system is the longest) to a high magnification end state (in a state where the focal length of the system is the shortest), the second lens group G2 and the third lens group G3 are moved along the optical axis in the opposite directions with each other.

In the zoom eyepiece lens system EL, the second lens group G2 is composed of, in order from the eyepoint EP side, a first lens (negative meniscus lens L3 in FIG. 1) having negative refractive power, a second lens (double convex lens L4 in FIG. 1) having positive refractive power, and a third lens (double convex lens L5 in FIG. 1) having positive refractive power. In this Example, the first lens L3 and the second lens L4 are cemented with each other composing a cemented lens. The third lens L5 composing the second lens group G2 is an aspherical lens in which an aspherical surface is formed on at least one surface thereof so as to secure an eye-relief and to excellently correct distortion.

Figure 1:
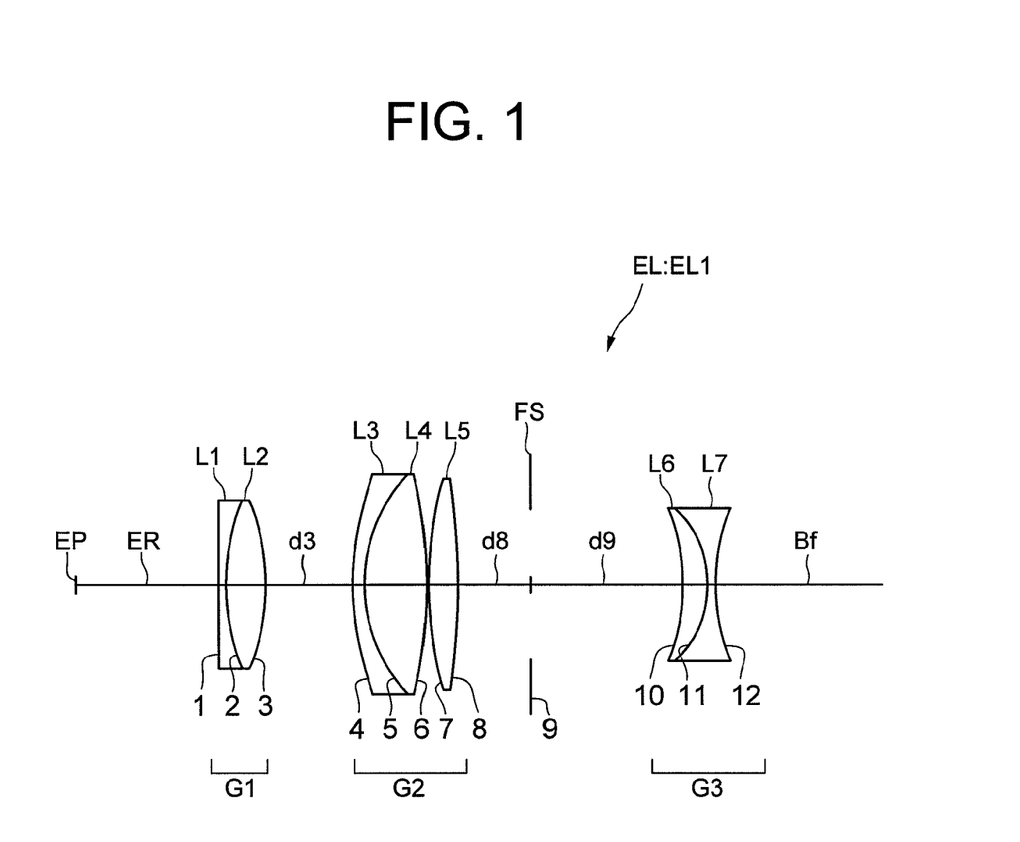
FIG. 1 is a sectional view showing a lens construction of a zoom eyepiece lens system according to Example 1 of the present invention.

Then, conditions for constructing the zoom eyepiece lens system EL are explained. The zoom eyepiece lens system EL is constructed with satisfying the following conditional expression (1):

$$|re| \leq |ro| \qquad (1)$$

where re denotes a radius of curvature of a reference sphere of the eyepoint EP side surface (the seventh surface in FIG. 1) of the third lens L5 composing the second lens group G2, and ro denotes a radius of curvature of a reference sphere of the object side surface (the eighth surface in FIG. 1) thereof.

Conditional expression (1) defines a basic shape of the third lens (aspherical lens) L5. When the third lens L5 does not satisfy conditional expression (1), it becomes difficult to secure the eye-relief, to excellently correct distortion, and to balance the other aberrations.

Such an aspherical surface is expressed by the aspherical expression (a) shown below. In the aspherical expression (a), y denotes a vertical height from the optical axis, x denotes a distance along the optical axis from the tangent surface at the vertex of the aspherical surface to the aspherical surface at the vertical height y from the optical axis, c denotes a radius of curvature of a reference sphere, k denotes a conical coefficient, and An denotes an aspherical coefficient of n-th order (here n=4, 6, 8, ... ):

$$x = cy^2/\{1+(1-kc^2y^2)^{1/2}\} + A4y^4 + A6y^6 + A8y^8 + \ldots \qquad (a).$$

In the zoom eyepiece lens system EL, a conical coefficient k, which is shown in the aspherical expression (a), of an aspherical surface formed on a surface of the third lens L5 composing the second lens group G2 satisfies the following conditional expression (2):

$$k \leq 0 \qquad (2).$$

Conditional expression (2) is for forming the aspherical surface formed on the third lens L5 on the basis of a hyperboloid. When the value exceeds the upper limit of conditional expression (2), the effect of the aspherical surface becomes insufficient, so that it becomes difficult to realize a long eye-relief and to excellently correct distortion. In order to secure the effect of the present invention, it is preferable to set the lower limit of conditional expression (2) to −10. In the aspherical surface of the third lens L5, the conical coefficient k in the aspherical expression (a) is preferably larger than −10. When it falls below −10, distortion becomes overcorrection.

EXAMPLES

Four examples according to the present invention are explained with reference to accompanying drawings. Incidentally, in each example, although the aspherical surface formed on the third lens L5 composing the second lens group G2 is expressed by the aspherical expression (a), aspherical coefficients An (n=4, 6, 8, ... ) are all zero. It is a matter of course that the aspherical coefficient An may have a value other than zero.

Example 1

FIG. 1 is a sectional view showing a lens construction of a zoom eyepiece lens system EL1 according to Example 1 of the present invention. As described above, the zoom eyepiece lens system EL1 shown in FIG. 1 is composed of, in order from an eyepoint EP side, a first lens group G1, a second lens group G2, and a third lens group G3. A field stop FS is provided between the second lens group G2 and the third lens group G3. The first lens group G1 is composed of, in order from the eyepoint EP side, a cemented lens constructed by a negative meniscus lens L1 having a convex surface facing the eyepoint EP side cemented with a double convex positive lens L2. The second lens group G2 is composed of, in order from the eyepoint EP side, a cemented lens constructed by a negative meniscus lens L3 (a first lens) having a convex surface facing the eyepoint EP side cemented with a double convex positive lens L4 (a second lens), and a double convex positive lens L5 (a third lens). The third lens group G3 is composed of, in order from the eyepoint EP side, a cemented lens constructed by a positive meniscus lens L6 having a concave surface facing the eyepoint EP side cemented with a double concave negative lens L7. In Example 1, both surfaces (the seventh surface and the eighth surface) of the third lens L5 composing the second lens group G2 are aspherical surfaces.

Various values associated with Example 1 are listed in Table 1. In Table 1, f denotes a focal length of the lens system, F.NO denotes an f-number, f1 denotes a focal length of the first lens group G1, f2 denotes a focal length of the second lens group G2, and f3 denotes a focal length of the third lens group G3. The first column shows a lens surface number counted along a light proceeding direction from the eyepoint EP, the second column shows a radius of curvature of each lens surface, the third column shows a surface distance from each optical surface to the next optical surface along the optical axis, the fourth column shows a refractive index at d-line (λ=587.6 nm), and the fifth column shows an Abbe number. An aspherical surface expressed by the aspherical expression (a) is shown by attaching "*" to the right side of the surface number. A radius of curvature equal to 0.000 denotes a plane surface, and the refractive index of the air 1.00000 is omitted. In respective tables for various values, "mm" is generally used for the unit of length such as the focal length f, f1 through f3, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols and tables is the same in the other Examples.

TABLE 1

|   | Low Mag. End | High Mag. End |
|---|---|---|
| f = | 26.25 | 8.75 |
| F. NO = | 6.16 | 6.16 |
| 2ω = | 44° | 66° |
| IH = | 10.6 | 5.7 |
| TL = | 68.5 | 80.7 | f1 = 55.5
f2 = 28.0
f3 = −28.5
[Lens Data]

| i | r | d | nd | ν |
|---|---|---|---|---|
| 1 | 300.000 | 1.30 | 1.75520 | 27.6 |
| 2 | 36.000 | 6.80 | 1.62041 | 60.1 |
| 3 | −32.370 | d3 | | |
| 4 | 48.500 | 1.50 | 1.80518 | 25.3 |
| 5 | 25.000 | 10.00 | 1.62041 | 60.1 |
| 6 | −80.000 | 0.30 | | |

TABLE 1-continued

| | | | | |
|---|---|---|---|---|
| 7* | 50.000 | 4.70 | 1.69350 | 53.4 |
| 8* | −91.413 | d8 | | |
| 9 | 0.000 | d9 | | |
| 10 | −31.000 | 4.40 | 1.79504 | 28.6 |
| 11 | −15.000 | 1.20 | 1.62374 | 47.1 |
| 12 | 31.000 | Bf | | |

[Aspherical Surface Data]

Surface Number = 7, k = −7.000
Surface Number = 8, k = −7.000

In Table 1, "Low Mag. End" denotes a low magnification end state, "High Mag. End" denotes a high magnification end state, 2ω denotes an angle of view, IH denotes an image height, TL denotes a total lens length. In [Lens Data], "i" denotes a surface number, "r" denotes a radius of curvature, "d" denotes a distance to the next optical surface, "nd" denotes a refractive index at d-line, and "ν" denotes an Abbe number. Reference symbols are the same as the other Examples.

In the zoom eyepiece lens system EL1, upon zooming, the second lens group G2 and the third lens group G3 move along the optical axis in opposite directions with each other, and the field stop FS also moves along the optical axis independently. Accordingly, a distance d3 along the optical axis between the first lens group G1 and the second lens group G2, a distance d8 along the optical axis between the second lens group G2 and the field stop FS, a distance d9 along the optical axis between the field stop FS and the third lens group G3, and the back focal length Bf are varied upon zooming. The eye-relief ER, and variable distances with respect to each focal length of the system in the low magnification end state and the high magnification end state are shown in Table 2. Here, the eye-relief ER is a distance along the optical axis between the eyepoint EP and the first surface.

TABLE 2

| | Low Mag. End | High Mag. End |
|---|---|---|
| f = | 26.25 | 8.75 |
| ER = | 21.8 | 16.6 |
| d3 = | 26.47 | 0.67 |
| d8 = | 8.20 | 13.37 |
| d9 = | 3.59 | 36.43 |
| Bf = | −6.04 | −18.26 |

In the following Table 3, values for respective conditional expressions according to Example 1 are listed. In Table 3, re denotes a radius of curvature of a reference sphere of the seventh surface of the third lens L5 composing the second lens group G2, and ro denotes a radius of curvature of a reference sphere of the eighth surface.

TABLE 3

(1) |re| = 50.000, |ro| = 91.413
(2) k = −7.000

As shown above, in Example 1, the above-described conditional expressions (1) and (2) are satisfied.

Figure 2:
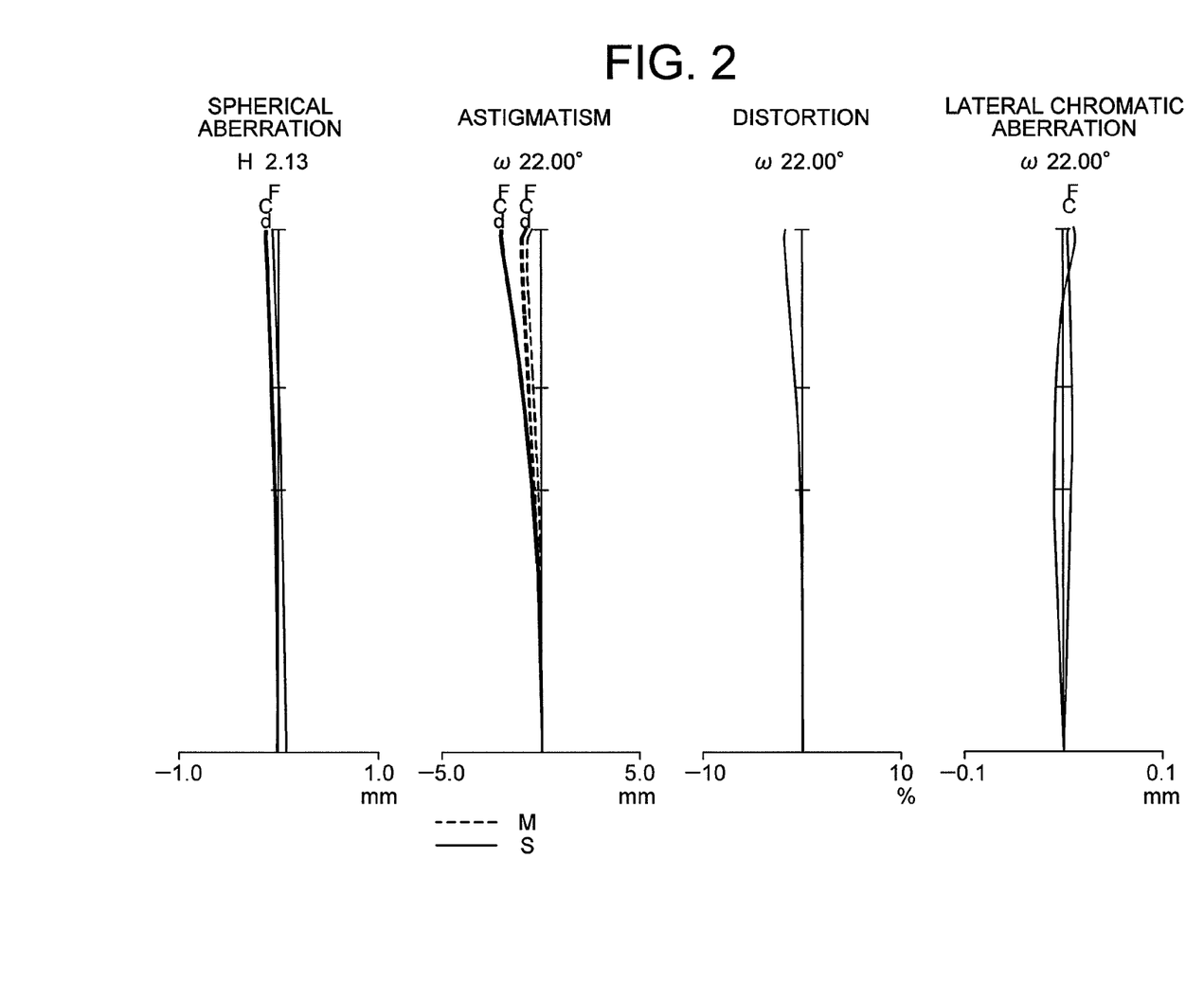
FIG. 2 is graphs showing various aberrations of the zoom eyepiece lens system according to Example 1 in a low magnification end state.
Figure 3:
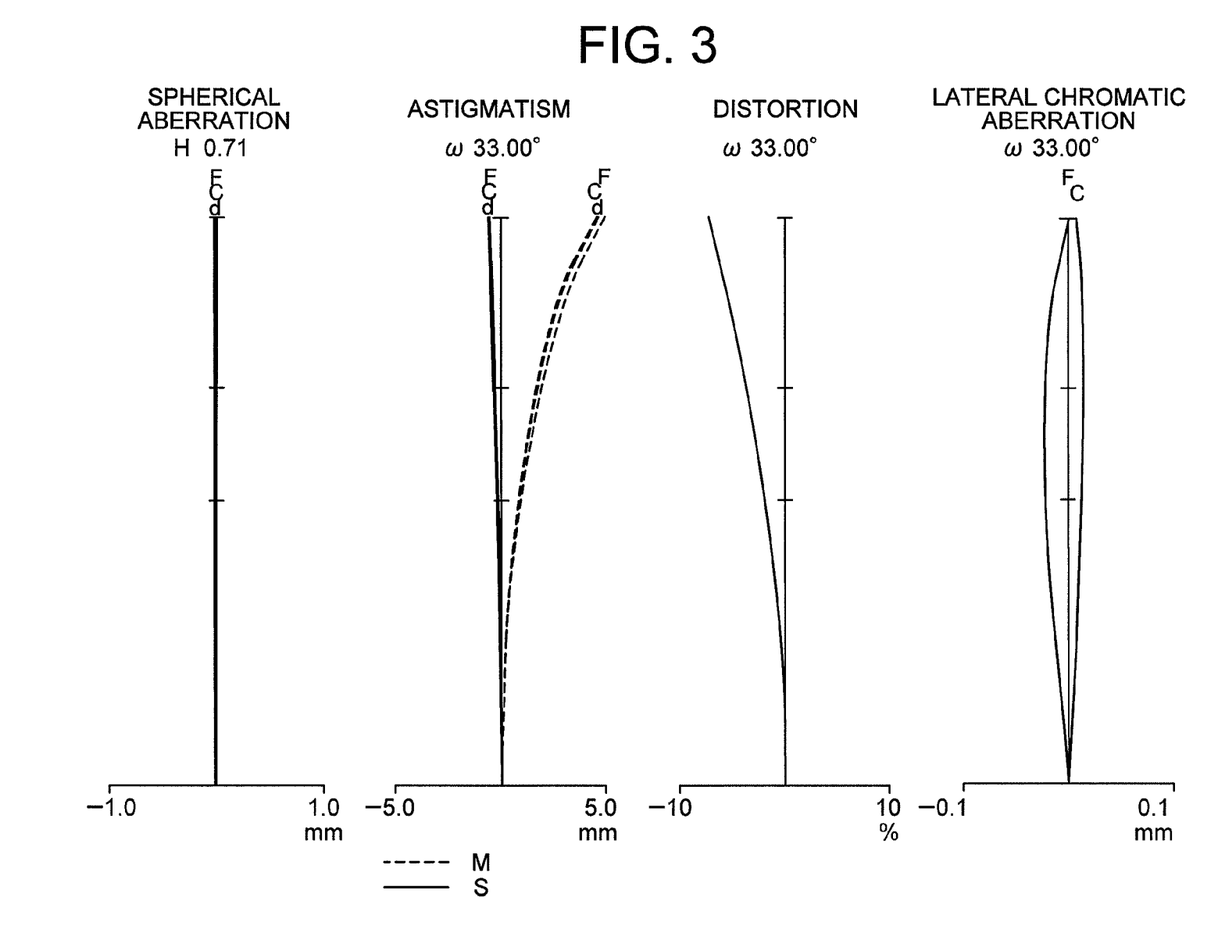
FIG. 3 is graphs showing various aberrations of the zoom eyepiece lens system according to Example 1 in a high magnification end state.

FIGS. 2 and 3 show spherical aberration, astigmatism, distortion, and lateral chromatic aberration with respect to d-line (λ=587.6 nm), C-line (λ=656.3 nm), and F-line (λ=486.1 nm) of the zoom eyepiece lens system EL1 according to Example 1, in which FIG. 2 shows various aberrations in a low magnification end state (f=26.25 mm), and FIG. 3 shows various aberrations in a high magnification end state (f=8.75 mm). In this Example, various aberrations in a state where light is incident on the zoom eyepiece lens system EL1 from the eyepoint EP are shown. In graph showing spherical aberration, a vertical height H from the optical axis is shown. In graphs showing astigmatism, distortion and lateral chromatic aberration, an angle of view ω (unit: degree) is shown. In graph showing astigmatism, a solid line indicates a sagittal image plane, and a broken line indicates a meridional image plane. The explanations regarding aberration graphs are the same as the other Examples. As is apparent from FIGS. 2 and 3, the zoom eyepiece lens system according to Example 1 shows superb optical performance as a result of good corrections to various aberrations.

Example 2

Figure 4:
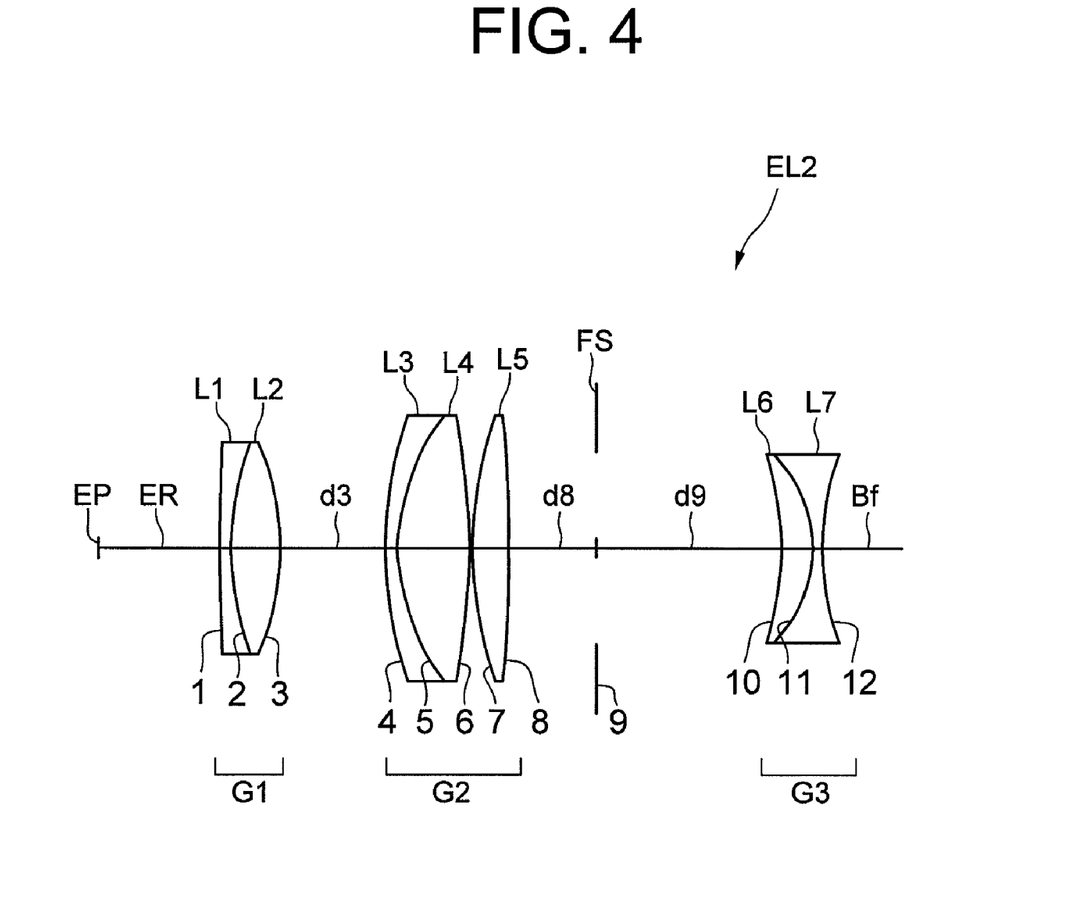
FIG. 4 is a sectional view showing a lens construction of a zoom eyepiece lens system according to Example 2 of the present invention.

FIG. 4 is a sectional view showing a lens construction of a zoom eyepiece lens system EL2 according to Example 2 of the present invention. The zoom eyepiece lens system EL2 shown in FIG. 4 is composed of, in order from the eyepoint EP side, a first lens group G1, a second lens group G2, and a third lens group G3. A field stop FS is disposed between the second lens group G2 and the third lens group G3. The first lens group G1 is composed of, in order from the eyepoint EP side, a cemented lens constructed by a negative meniscus lens L1 having a convex surface facing the eyepoint EP side cemented with a double convex positive lens L2. The second lens group G2 is composed of, in order from the eyepoint EP side, a cemented lens constructed by a negative meniscus lens L3 (a first lens) having a convex surface facing the eyepoint EP side cemented with a double convex positive lens L4 (a second lens), and a double convex positive lens L5 (a third lens). The third lens group G3 is composed of, in order from the eyepoint EP side, a cemented lens constructed by a positive meniscus lens L6 having a concave surface facing the eyepoint EP side cemented with a double concave negative lens L7. In Example 2, an aspherical surface is formed on the eyepoint EP side surface (the seventh surface) of the third lens L5 composing the second lens group G2.

Various values associated with Example 2 are listed in Table 4.

TABLE 4

| | Low Mag. End | High Mag. End |
|---|---|---|
| f = | 26.25 | 8.75 |
| F. NO = | 6.16 | 6.16 |
| 2ω = | 44° | 66° |
| IH = | 10.6 | 5.7 |
| TL = | 66.5 | 79.2 | f1 = 54.0
f2 = 28.0
f3 = −30.0

[Lens Data]

| i | r | d | nd | ν |
|---|---|---|---|---|
| 1 | 300.000 | 1.30 | 1.75520 | 27.6 |
| 2 | 36.000 | 6.30 | 1.62230 | 53.2 |
| 3 | −31.730 | d3 | | |
| 4 | 48.500 | 1.50 | 1.80518 | 25.3 |
| 5 | 25.000 | 9.30 | 1.62041 | 60.1 |
| 6 | −80.000 | 0.30 | | |
| 7* | 39.000 | 4.60 | 1.69350 | 53.4 |
| 8 | −217.750 | d8 | | |
| 9 | 0.000 | d9 | | |

TABLE 4-continued

| | | | | |
|---|---|---|---|---|
| 10 | −33.490 | 3.80 | 1.80518 | 25.3 |
| 11 | −16.000 | 1.20 | 1.62230 | 53.2 |
| 12 | 31.000 | Bf | | |

[Aspherical Surface Data]

Surface Number = 7, k = −3.000

In the zoom eyepiece lens system EL2, upon zooming, the second lens group G2 and the third lens group G3 move along the optical axis in opposite directions with each other, and the field stop FS also moves along the optical axis independently. Accordingly, a distance d3 along the optical axis between the first lens group G1 and the second lens group G2, a distance d8 along the optical axis between the second lens group G2 and the field stop FS, a distance d9 along the optical axis between the field stop FS and the third lens group G3, and the back focal length Bf are varied upon zooming. The eye-relief ER, and variable distances with respect to each focal length of the system in the low magnification end state and the high magnification end state are shown in Table 5.

TABLE 5

| | Low Mag. End | High Mag. End |
|---|---|---|
| f = | 26.25 | 8.75 |
| ER = | 21.3 | 16.5 |
| d3 = | 26.75 | 0.59 |
| d8 = | 7.75 | 13.15 |
| d9 = | 3.66 | 37.19 |
| Bf = | −5.81 | −18.59 |

In the following Table 6, values for respective conditional expressions according to Example 2 are listed. In Table 6, re denotes a radius of curvature of a reference sphere of the seventh surface of the third lens L5 composing the second lens group G2, and ro denotes a radius of curvature of a reference sphere of the eighth surface thereof.

TABLE 6

(1) |re| = 39.000, |ro| = 217.750
(2) k = −3.000

As shown above, in Example 2, the above-described conditional expressions (1) and (2) are satisfied.

Figure 5:
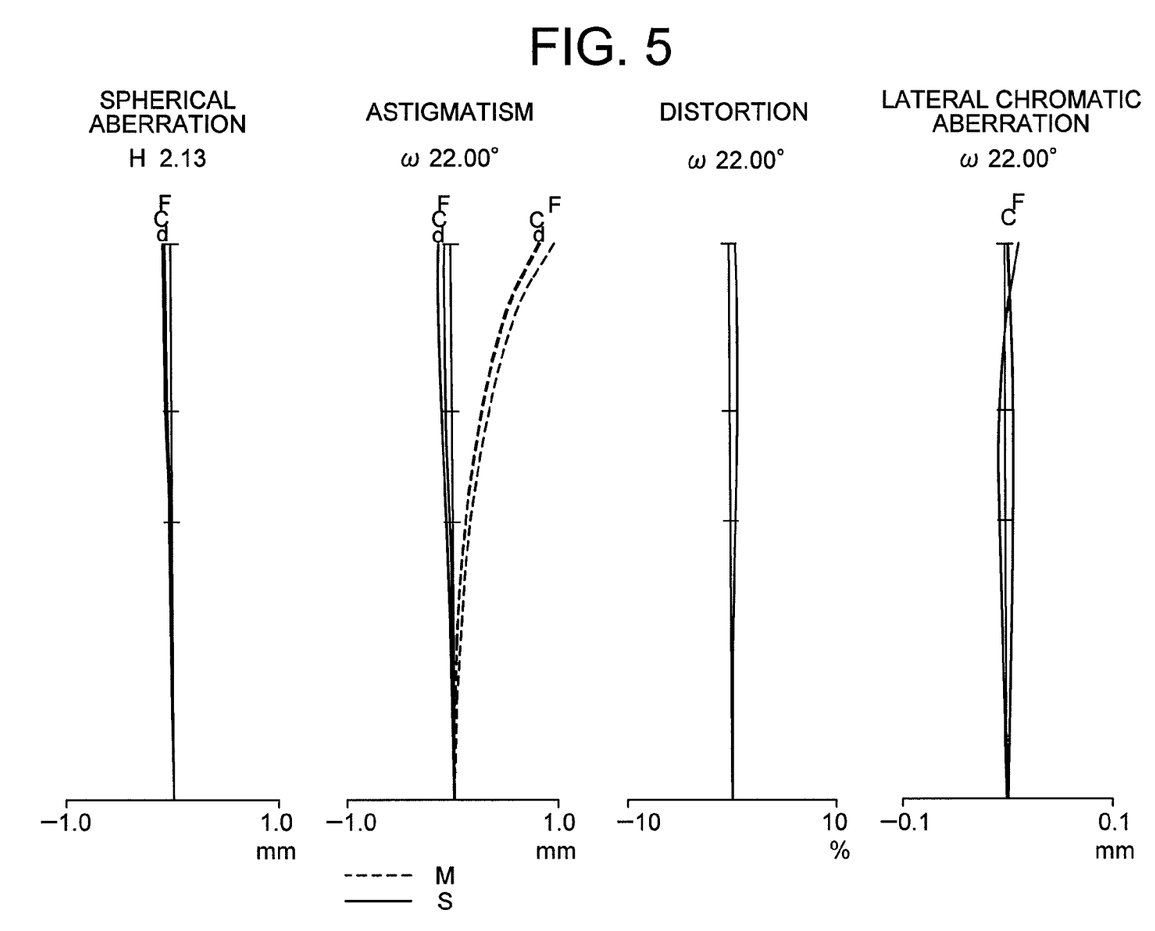
FIG. 5 is graphs showing various aberrations of the zoom eyepiece lens system according to Example 2 in a low magnification end state.
Figure 6:
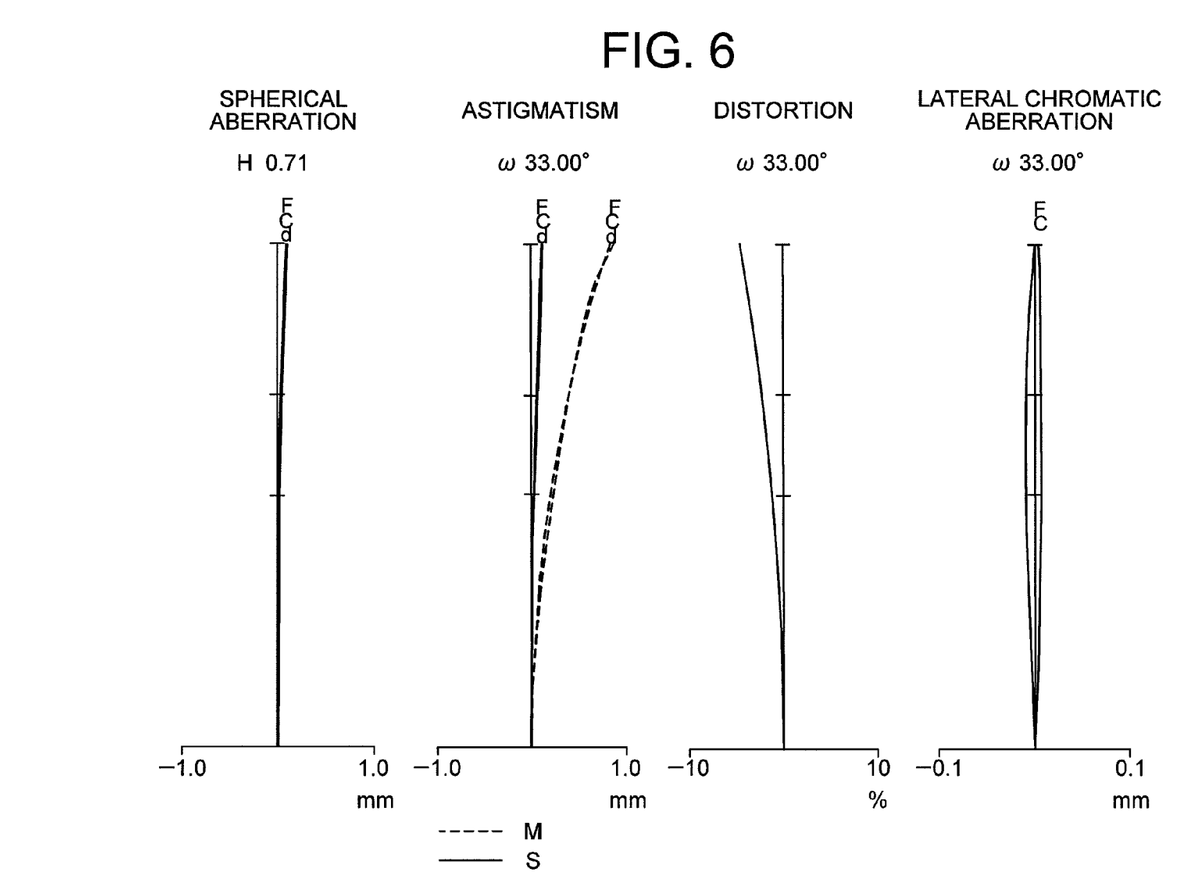
FIG. 6 is graphs showing various aberrations of the zoom eyepiece lens system according to Example 2 in a high magnification end state.

FIGS. 5 and 6 show spherical aberration, astigmatism, distortion, and lateral chromatic aberration with respect to d-line ($\lambda$=587.6 nm), C-line ($\lambda$=656.3 nm), and F-line ($\lambda$=486.1 nm) of the zoom eyepiece lens system EL2 according to Example 2. As is apparent from FIGS. 5 and 6, the zoom eyepiece lens system according to Example 2 shows superb optical performance as a result of good corrections to various aberrations.

Example 3

Figure 7:
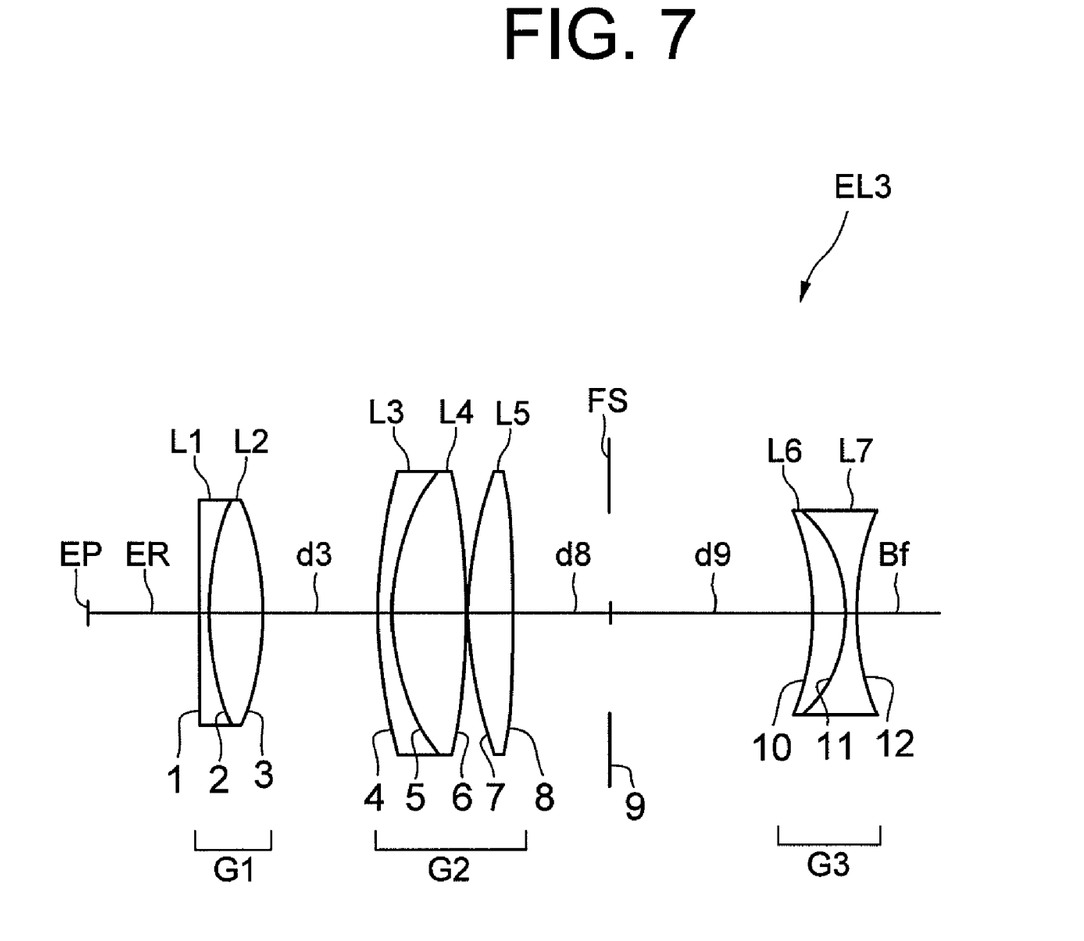
FIG. 7 is a sectional view showing a lens construction of a zoom eyepiece lens system according to Example 3 of the present invention.

FIG. 7 is a sectional view showing a lens construction of a zoom eyepiece lens system EL3 according to Example 3 of the present invention. The zoom eyepiece lens system EL3 shown in FIG. 7 is composed of, in order from the eyepoint EP side, a first lens group G1, a second lens group G2, and a third lens group G3. A field stop FS is disposed between the second lens group G2 and the third lens group G3. The first lens group G1 is composed of, in order from the eyepoint EP side, a cemented lens constructed by a negative meniscus lens L1 having a convex surface facing the eyepoint EP side cemented with a double convex positive lens L2. The second lens group G2 is composed of, in order from the eyepoint EP side, a cemented lens constructed by a negative meniscus lens L3 (a first lens) having a convex surface facing the eyepoint EP side cemented with a double convex positive lens L4 (a second lens), and a double convex positive lens L5 (a third lens). The third lens group G3 is composed of, in order from the eyepoint EP side, a cemented lens constructed by a positive meniscus lens L6 having a concave surface facing the eyepoint EP side cemented with a double concave negative lens L7. In Example 3, an aspherical surface is formed on the eyepoint EP side surface (the seventh surface) of the third lens L5 composing the second lens group G2.

Various values associated with Example 3 are listed in Table 7.

TABLE 7

| | Low Mag. End | High Mag. End |
|---|---|---|
| f = | 26.25 | 8.75 |
| F. NO = | 6.16 | 6.16 |
| 2ω = | 44° | 66° |
| IH = | 10.6 | 5.7 |
| TL = | 67.4 | 80.5 | f1 = 54.0
f2 = 28.0
f3 = −31.0

[Lens Data]

| i | r | d | nd | ν |
|---|---|---|---|---|
| 1 | 0.000 | 1.30 | 1.75520 | 27.6 |
| 2 | 36.000 | 6.50 | 1.62230 | 53.2 |
| 3 | −28.425 | d3 | | |
| 4 | 53.850 | 1.50 | 1.80518 | 25.3 |
| 5 | 25.000 | 9.00 | 1.62041 | 60.1 |
| 6 | −80.000 | 0.30 | | |
| 7* | 38.965 | 5.20 | 1.69350 | 53.4 |
| 8 | −146.135 | d8 | | |
| 9 | 0.000 | d9 | | |
| 10 | −33.640 | 3.50 | 1.80518 | 25.3 |
| 11 | −17.000 | 1.20 | 1.62230 | 53.2 |
| 12 | 33.500 | Bf | | |

[Aspherical Surface Data]

Surface Number = 7, k = −1.000

In the zoom eyepiece lens system EL3, upon zooming, the second lens group G2 and the third lens group G3 move along the optical axis in opposite directions with each other, and the field stop FS also moves along the optical axis independently. Accordingly, a distance d3 along the optical axis between the first lens group G1 and the second lens group G2, a distance d8 along the optical axis between the second lens group G2 and the field stop FS, a distance d9 along the optical axis between the field stop FS and the third lens group G3, and the back focal length Bf are varied upon zooming. The eye-relief ER, and variable distances with respect to each focal length of the system in the low magnification end state and the high magnification end state are shown in Table 8.

TABLE 8

| | Low Mag. End | High Mag. End |
|---|---|---|
| f = | 26.25 | 8.75 |
| ER = | 18.8 | 15.0 |
| d3 = | 27.10 | 0.52 |
| d8 = | 7.90 | 13.36 |

TABLE 8-continued

|  | Low Mag. End | High Mag. End |
|---|---|---|
| d9 = | 3.89 | 38.15 |
| Bf = | −5.87 | −19.01 |

In the following Table 9, values for respective conditional expressions according to Example 3 are listed. In Table 9, re denotes a radius of curvature of a reference sphere of the seventh surface of the third lens L5 composing the second lens group G2, and ro denotes a radius of curvature of a reference sphere of the eighth surface thereof.

TABLE 9

(1) |re| = 38.965, |ro| = 146.135
(2) k = −1.000

As shown above, in Example 3, the above-described conditional expressions (1) and (2) are satisfied.

Figure 8:
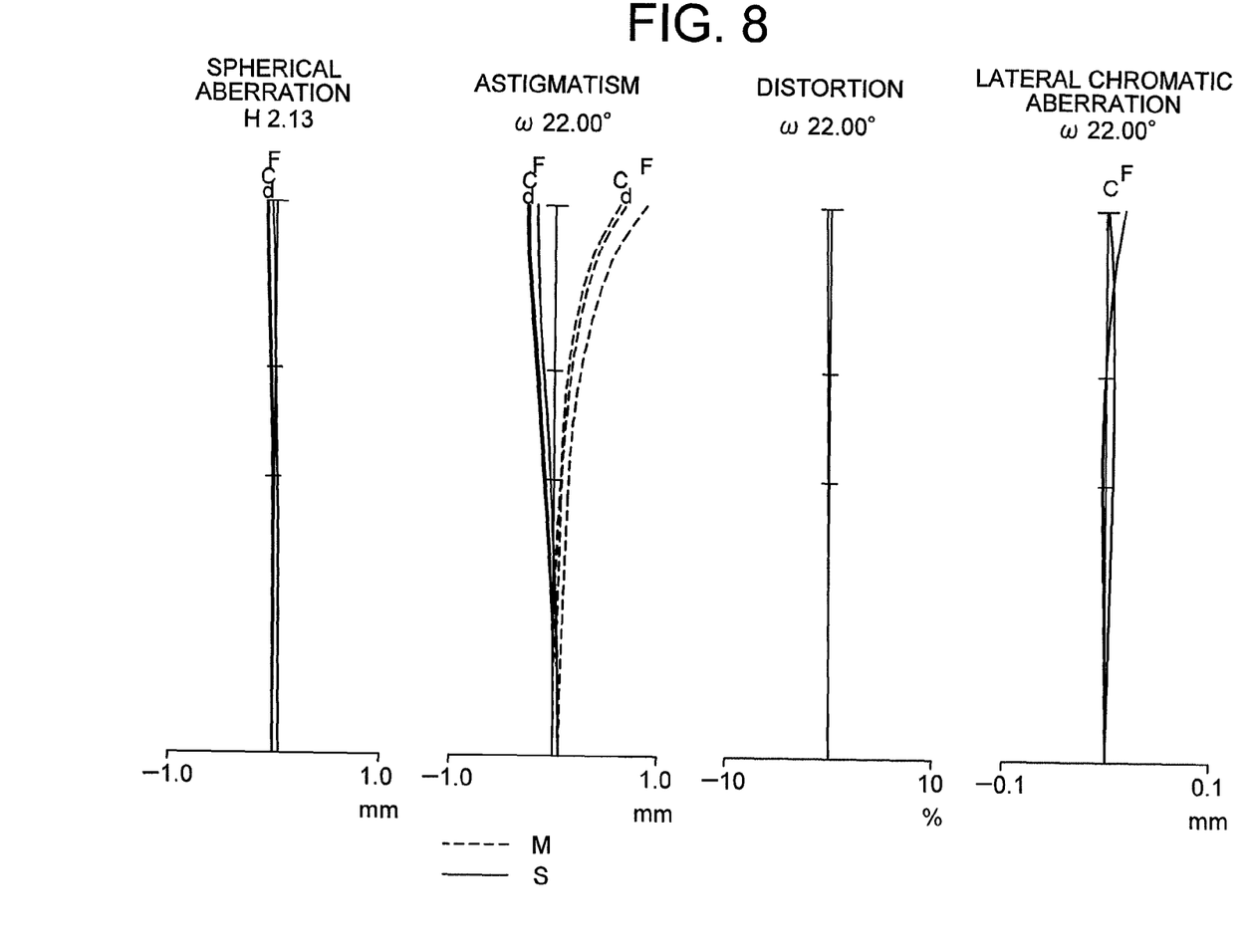
FIG. 8 is graphs showing various aberrations of the zoom eyepiece lens system according to Example 3 in a low magnification end state.
Figure 9:
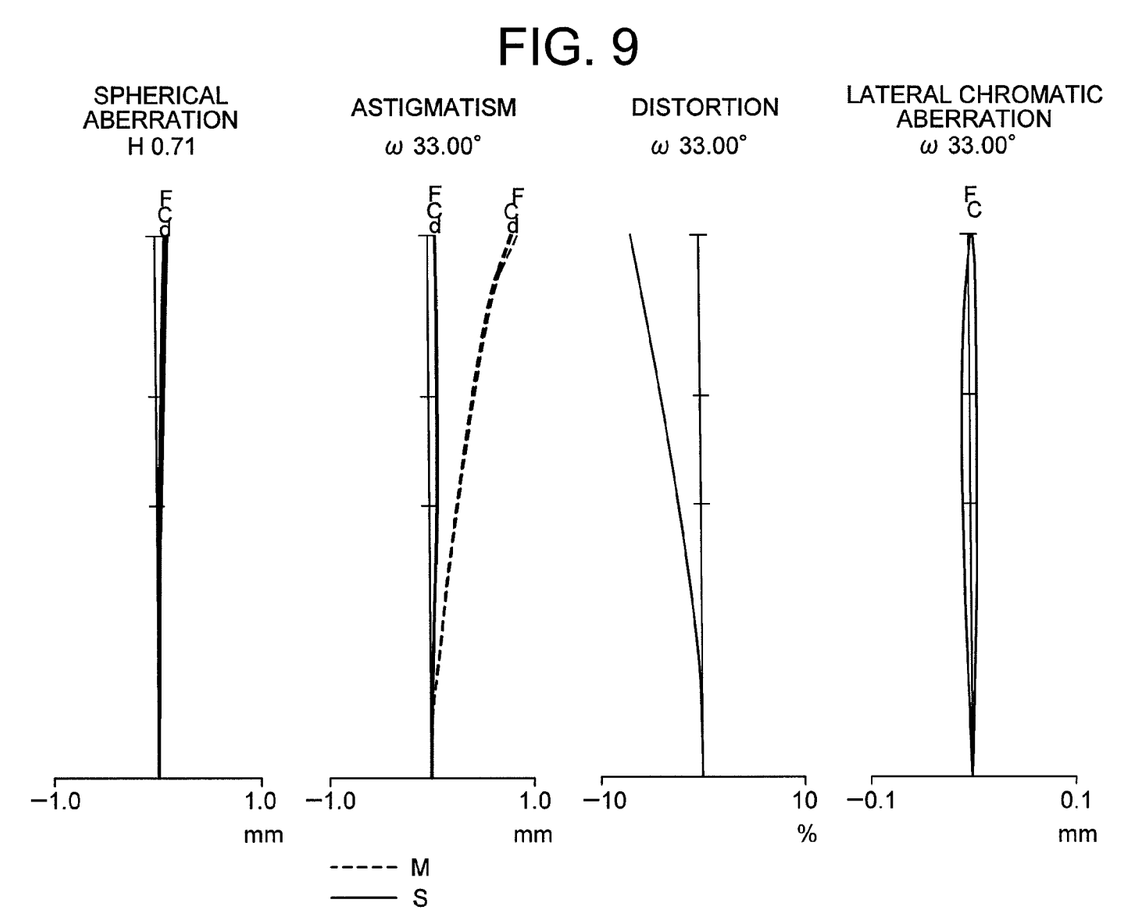
FIG. 9 is graphs showing various aberrations of the zoom eyepiece lens system according to Example 3 in a high magnification end state.

FIGS. 8 and 9 show spherical aberration, astigmatism, distortion, and lateral chromatic aberration with respect to d-line ($\lambda$=587.6 nm), C-line ($\lambda$=656.3 nm), and F-line ($\lambda$=486.1 nm) of the zoom eyepiece lens system EL3 according to Example 3. As is apparent from FIGS. 8 and 9, the zoom eyepiece lens system according to Example 3 shows superb optical performance as a result of good corrections to various aberrations.

Example 4

Figure 10:
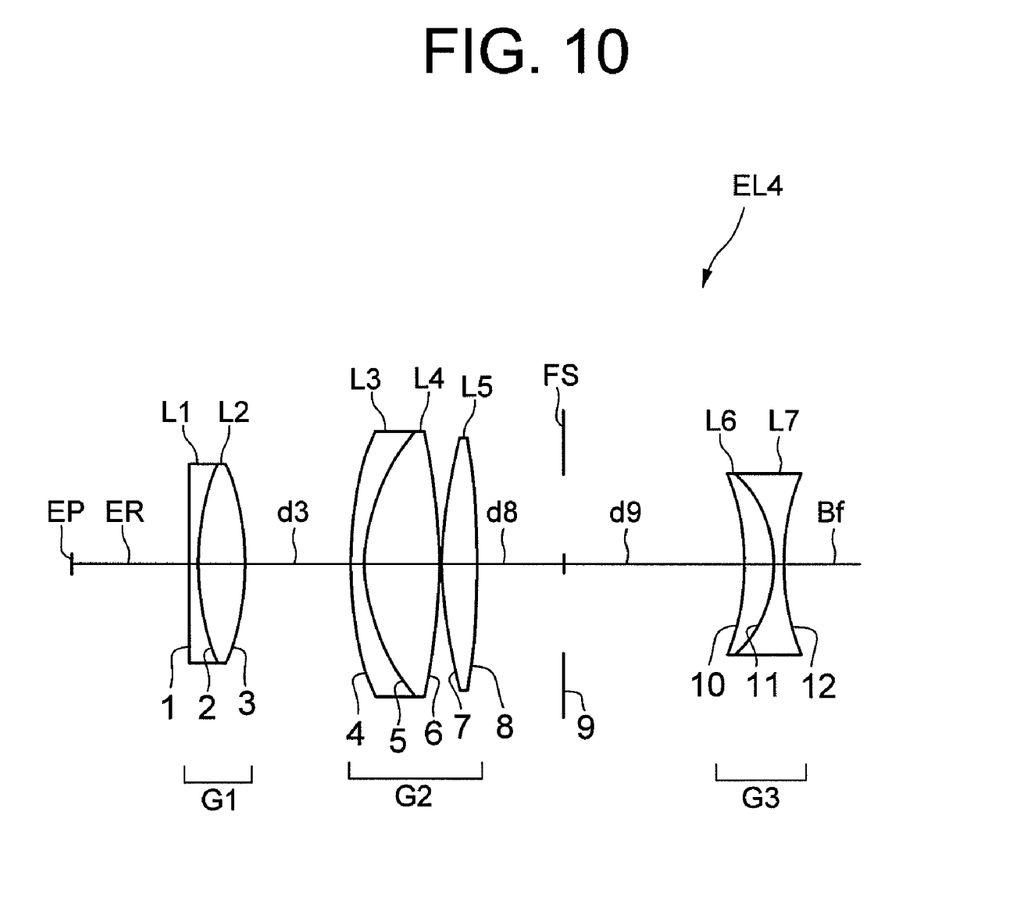
FIG. 10 is a sectional view showing a lens construction of a zoom eyepiece lens system according to Example 4 of the present invention.

FIG. 10 is a sectional view showing a lens construction of a zoom eyepiece lens system EL4 according to Example 4 of the present invention. The zoom eyepiece lens system EL4 shown in FIG. 10 is composed of, in order from the eyepoint EP side, a first lens group G1, a second lens group G2, and a third lens group G3. A field stop FS is disposed between the second lens group G2 and the third lens group G3. The first lens group G1 is composed of, in order from the eyepoint EP side, a cemented lens constructed by a negative meniscus lens L1 having a convex surface facing the eyepoint EP side cemented with a double convex positive lens L2. The second lens group G2 is composed of, in order from the eyepoint EP side, a cemented lens constructed by a negative meniscus lens L3 (a first lens) having a convex surface facing the eyepoint EP side cemented with a double convex positive lens L4 (a second lens), and a double convex positive lens L5 (a third lens). The third lens group G3 is composed of, in order from the eyepoint EP side, a cemented lens constructed by a positive meniscus lens L6 having a concave surface facing the eyepoint EP side cemented with a double concave negative lens L7. In Example 4, an aspherical surface is formed on the both sides (the seventh surface and the eighth surface) of the third lens L5 composing the second lens group G2.

Various values associated with Example 4 are listed in Table 10.

TABLE 10

|  | Low Mag. End | High Mag. End |
|---|---|---|
| f = | 26.25 | 8.75 |
| F. NO = | 6.16 | 6.16 |
| 2ω = | 44° | 66° |
| IH = | 10.6 | 5.7 |
| TL = | 67.8 | 80.1 |

TABLE 10-continued f1 = 55.0
f2 = 28.0
f3 = −29.0

[Lens Data]

| i | r | d | nd | ν |
|---|---|---|---|---|
| 1 | 298.473 | 1.30 | 1.80518 | 25.3 |
| 2 | 36.000 | 6.40 | 1.62230 | 53.1 |
| 3 | −30.500 | d3 |  |  |
| 4 | 48.566 | 1.70 | 1.80518 | 25.3 |
| 5 | 25.000 | 9.80 | 1.62041 | 60.1 |
| 6 | −80.000 | 0.30 |  |  |
| 7* | 50.000 | 4.70 | 1.69350 | 53.4 |
| 8* | −91.100 | d8 |  |  |
| 9 | 0.000 | d9 |  |  |
| 10 | −31.440 | 3.90 | 1.80384 | 33.9 |
| 11 | −16.000 | 1.20 | 1.62041 | 60.1 |
| 12 | 31.440 | Bf |  |  |

[Aspherical Surface Data]

Surface Number = 7, k = −6.000
Surface Number = 8, k = −6.000

In the zoom eyepiece lens system EL4, upon zooming, the second lens group G2 and the third lens group G3 move along the optical axis in opposite directions with each other, and the field stop FS also moves along the optical axis independently. Accordingly, a distance d3 along the optical axis between the first lens group G1 and the second lens group G2, a distance d8 along the optical axis between the second lens group G2 and the field stop FS, a distance d9 along the optical axis between the field stop FS and the third lens group G3, and the back focal length Bf are varied upon zooming. The eye-relief ER, and variable distances with respect to each focal length of the system in the low magnification end state and the high magnification end state are shown in Table 11.

TABLE 11

|  | Low Mag. End | High Mag. End |
|---|---|---|
| f = | 26.25 | 8.75 |
| ER = | 21.8 | 16.6 |
| d3 = | 26.66 | 0.70 |
| d8 = | 8.05 | 13.32 |
| d9 = | 3.75 | 36.81 |
| Bf = | −5.92 | −18.29 |

In the following Table 11 [sic], values for respective conditional expressions according to Example 4 are listed. In Table 11 [sic], re denotes a radius of curvature of a reference sphere of the seventh surface of the third lens L5 composing the second lens group G2, and ro denotes a radius of curvature of a reference sphere of the eighth surface thereof.

TABLE 3

[sic]

(1) |re| = 50.000, |ro| = 91.100
(2) k = −6.000

As shown above, in Example 4, the above-described conditional expressions (1) and (2) are satisfied.

Figure 11:
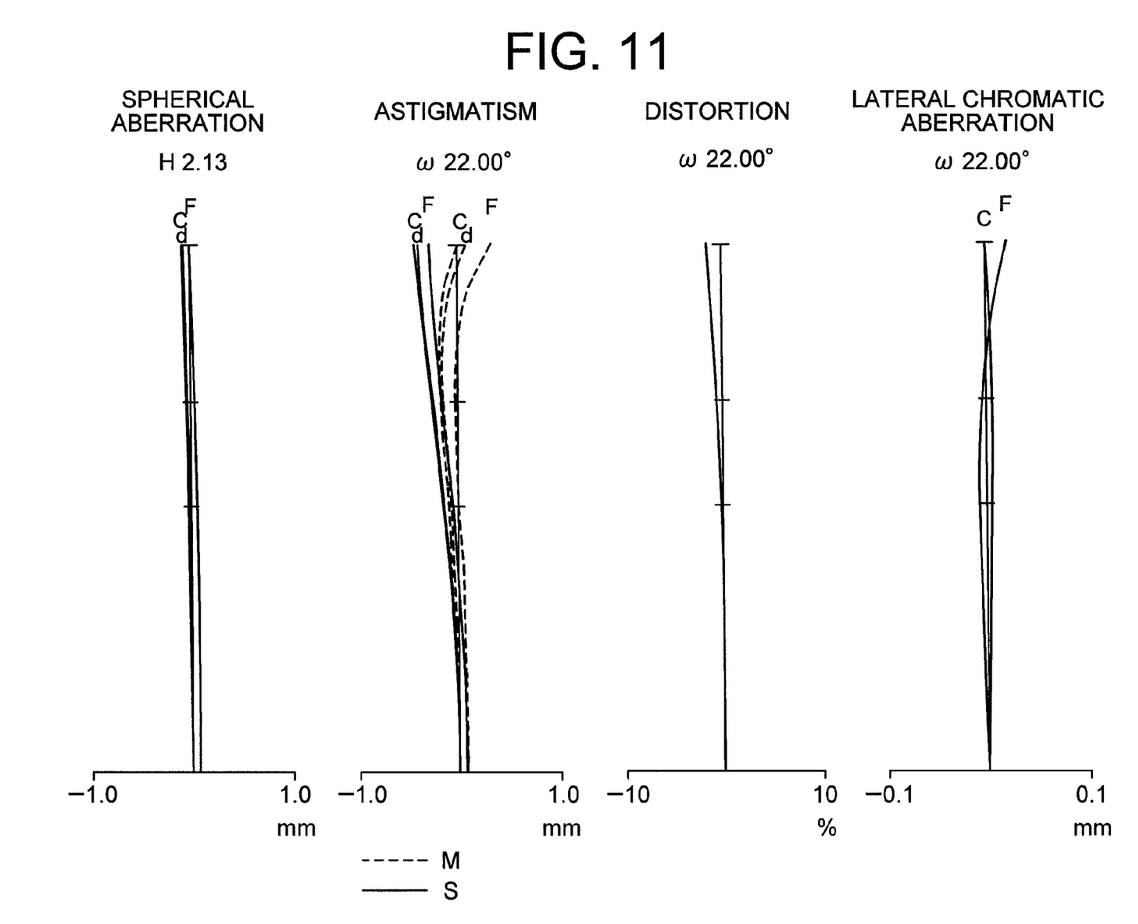
FIG. 11 is graphs showing various aberrations of the zoom eyepiece lens system according to Example 4 in a low magnification end state.
Figure 12:
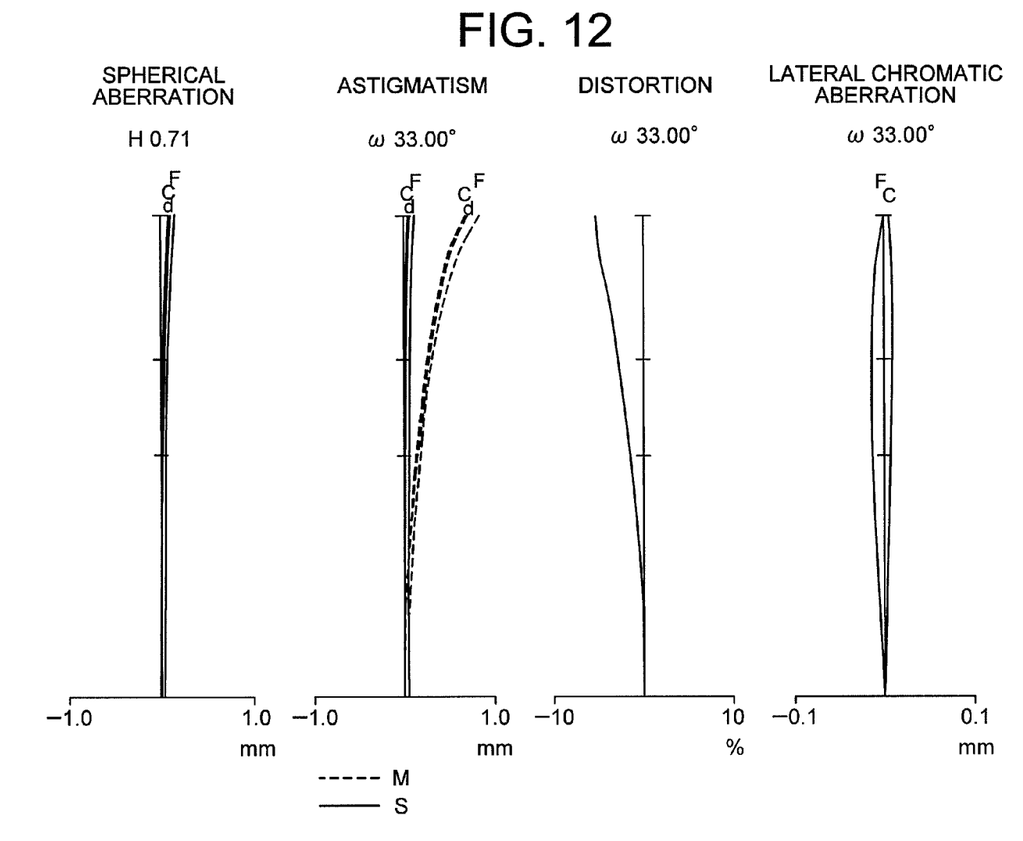
FIG. 12 is graphs showing various aberrations of the zoom eyepiece lens system according to Example 4 in a high magnification end state.

FIGS. 11 and 12 show spherical aberration, astigmatism, distortion, and lateral chromatic aberration with respect to d-line ($\lambda$=587.6 nm), C-line ($\lambda$=656.3 nm), and F-line ($\lambda$=486.1 nm) of the zoom eyepiece lens system EL4 according to Example 4. As is apparent from FIGS. 11 and 12, the zoom eyepiece lens system according to Example 4 shows superb optical performance as a result of good corrections to various aberrations.

What is claimed is:

1. A zoom eyepiece lens system comprising, in order from an observation eye side:
    a first lens group having positive refractive power;
    a second lens group having positive refractive power; and
    a third lens group having negative refractive power;
    upon zooming from a low magnification end state to a high magnification end state, the second lens group and the third lens group moving along an optical axis in opposite directions with each other,
    the second lens group including, in order from the observation eye side, a first lens having negative refractive power, a second lens having positive refractive power, and a third lens having positive refractive power, and
    at least one aspherical surface being formed on the third lens.

2. The zoom eyepiece lens system according to claim 1, wherein when the aspherical surface in the third lens composing the second lens group is expressed by the following expression:

$$x = cy^2/\{1+(1-kc^2y^2)^{1/2}\} + A4y^4 + A6y^6 + A8y^8 + \ldots$$

where y denotes a vertical height from an optical axis, x denotes a distance along the optical axis from a tangent surface on the vertex of the aspherical surface to the aspherical surface at the height y, c denotes a radius of curvature of a reference sphere, k denotes a conical coefficient, and An denotes an aspherical coefficient of n-th order (where n=4, 6, 8, ...), the conical coefficient k satisfies the following conditional expression:

$$k \leq 0.$$

3. The zoom eyepiece lens system according to claim 1, wherein the following conditional expression is satisfied:

$$|re| \leq |ro|$$

where re denotes a radius of curvature of the reference sphere of the observation eye side of the third lens composing the second lens group, and ro denotes a radius of curvature of the reference sphere of an object side thereof.

4. The zoom eyepiece lens system according to claim 3, wherein when the aspherical surface in the third lens composing the second lens group is expressed by the following expression:

$$x = cy^2/\{1+(1-kc^2y^2)^{1/2}\} + A4y^4 + A6y^6 + A8y^8 + \ldots$$

where y denotes a vertical height from an optical axis, x denotes a distance along the optical axis from a tangent surface on the vertex of the aspherical surface to the aspherical surface at the height y, c denotes a radius of curvature of a reference sphere, k denotes a conical coefficient, and An denotes an aspherical coefficient of n-th order (where n=4, 6, 8, ...), the conical coefficient k satisfies the following conditional expression:

$$k \leq 0.$$

* * * * *

UNITED STATES PATENT AND TRADEMARK OFFICE
CERTIFICATE OF CORRECTION

PATENT NO. : 7,903,343 B2
APPLICATION NO. : 12/709226
DATED : March 8, 2011
INVENTOR(S) : Kenji Yamada It is certified that error appears in the above-identified patent and that said Letters Patent is hereby corrected as shown below:

On the Title Page:

In item (73), the Assignee should read as follows:

(73) Assignee: Nikon Vision Co., Ltd., Tokyo (JP).

Signed and Sealed this
Twelfth Day of November, 2013

Teresa Stanek Rea
*Deputy Director of the United States Patent and Trademark Office*